(Model.) 6 Sheets—Sheet 1.

H. E. & E. F. GRANDY.
MACHINE FOR MAKING HORSESHOE NAILS.

No. 268,791. Patented Dec. 12, 1882.

Fig. 1.

WITNESSES
E. A. Phalen
W. C. Fogg.

INVENTORS
H. E. Grandy
E. F. Grandy
by their attys
Parker & Raymond.

(Model.)

H. E. & E. F. GRANDY.
MACHINE FOR MAKING HORSESHOE NAILS.

No. 268,791. Patented Dec. 12, 1882.

WITNESSES
E. A. Thalen.
W. C. Fogg.

INVENTORS
H. E. Grandy
E. F. Grandy
by their attys
Clarke & Raymond (Model.)

H. E. & E. F. GRANDY.
MACHINE FOR MAKING HORSESHOE NAILS.

No. 268,791.

Patented Dec. 12, 1882.

WITNESSES
E. A. Shalen
W. C. Fogg

INVENTORS
H. E. Grandy
E. F. Grandy
by their atty
Clarke & Raymond (Model.)

H. E. & E. F. GRANDY.
MACHINE FOR MAKING HORSESHOE NAILS.

No. 268,791. Patented Dec. 12, 1882.

WITNESSES
E. A. Shalen.
W. C. Fogg.

INVENTORS
H. E. Grandy
E. F. Grandy
by their attys
Clarke + Raymond (Model.) 6 Sheets—Sheet 5.

H. E. & E. F. GRANDY.
MACHINE FOR MAKING HORSESHOE NAILS.

No. 268,791. Patented Dec. 12, 1882.

WITNESSES
E. A. Phelen
W. C. Fogg

INVENTORS
H. E. Grandy
E. F. Grandy
by their atty
Clarke & Raymond (Model.)

H. E. & E. F. GRANDY.
MACHINE FOR MAKING HORSESHOE NAILS.

No. 268,791. Patented Dec. 12, 1882.

WITNESSES
Willard L. Fogg.
Fred. Harris

INVENTORS
H. E. Grandy
E. Frank Grandy
by his attys
Clarke & Raymond

UNITED STATES PATENT OFFICE.

HENRY E. GRANDY AND EDWARD F. GRANDY, OF BOSTON, MASSACHUSETTS.

MACHINE FOR MAKING HORSESHOE-NAILS.

SPECIFICATION forming part of Letters Patent No. 268,791, dated December 12, 1882.

Application filed July 25, 1881. (Model.)

*To all whom it may concern:*

Be it known that we, HENRY E. GRANDY and EDWARD F. GRANDY, both of Boston, in the county of Suffolk and State of Massachusetts, citizens of the United States, have invented a certain new and useful Improvement in the Manufacture of Horseshoe-Nails, of which the following is a full, clear, and exact description, reference being had to the accompanying drawings in explaining its nature, in which—

Our invention relates to machines for manufacturing horseshoe-nails from rolled metal plate or bar having a head-forming portion upon one side thereof longer than the head of the finished nail, and having a shank-forming portion of substantially the length, thickness, and taper of the finished nail; and it embraces mechanism for automatically feeding said nail-plate to the punch and die, said punch and die, which punches from the plate a blank, having a head-forming portion longer than the complete nail, and a shank of the width, thickness, length, and taper of the finished nail; a series of blank-holders arranged upon a blank-carrier and adapted to be brought successively below the die, in which holder the nail is straightened by the punch immediately after it has punched the blank from the plate; the said carrier, which is adapted to be revolved and to simultaneously bring the holder under the punch to transfer a blank from a die and punch to the heading mechanism, and to transfer a complete nail from the heading mechanism to the devices for removing the nail from the blank-holder, and said heading mechanism and said devices for removing the headed nail from the blank-holder.

It further embraces various details of construction, which are hereinafter more fully set forth.

We are aware that the patent granted to T. Carpenter, No. 20,141, dated May 4, 1858, shows and describes a machine for making horseshoe-nails in which a flat nail-plate of uniform thickness is presented to a punching mechanism by the operator, who turns the plate for each blank cut, and in which the punched blanks fall into and fill a box below the die, from the bottom of which they escape one by one to a revolving carrying device, which has a holder for receiving a portion of the head and shank, and which carrying device advances the blanks successively from the box to the heading and swaging mechanism, and which upsets the head and tapers the shank, and to devices for removing the blank from the holder; and our invention is an improvement upon the Carpenter organization. Among the chief differences which exist between the two may be mentioned our use of an automatic feeding mechanism in lieu of the hand feed of Carpenter, the doing away with the Carpenter box for receiving the blanks, and the arrangement of the punch and die and blank carrier and holders, whereby the blank is straightened by the punch in the holder, the formation in the rolled plate of the necessary taper for the finished nail, which renders swaging in the machine unnecessary, and which enables us to use a covering-plate for all sizes of nails instead of a swage for each size, the consequent change in the length of the blank-holder, and the specific devices for operating the various parts of the machine, which are very different in organization and construction from those described by Carpenter.

We are also aware that it has been common in needle and other machines to feed material to devices which grasp it, and are moved forward by a cam, and are then retracted by a spring; and our feeding mechanism is an improvement upon this, in that the feeding device is moved positively in both directions by the same cam and without the assistance of a spring.

In the drawings, A is the bed of the machine. A' A' are a bracket and housing at opposite ends of the machine, which furnish bearings for the main shaft $A^2$.

Figure 8:
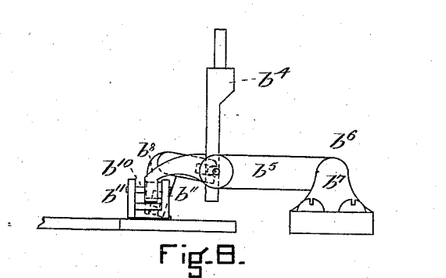
Figs. 8 and 9 are detail views of a portion of the nail-plate-feeding mechanism.
Figure 9:
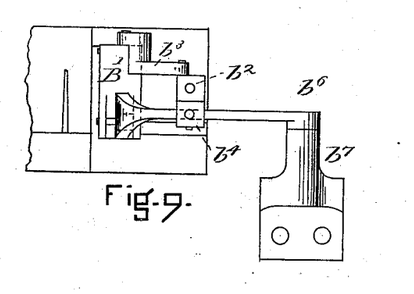

The devices for feeding the nail-plate to the punch and die consist in the plate B, preferably provided with a recess in its upper portion approximating the shape of the nail-plate, which is reciprocated intermittingly to and from the die by means of the cam-groove $b$ in the cam-disk $b'$ on the main shaft, the connecting bar or rod $b^2$, and the crank $b^3$, which connects the end of the connecting-bar with the side of the plate B, or with the block or jaw B', which is hinged at one end to the plate B. This block or jaw B' is hinged at one end to the side of the reciprocating plate B, and it is given a downward movement immediately before the commencement of the forward movement of the plate B and an upward movement at the completion of the forward movement of said plate after the punch has severed the blank from the end of the nail-plate. The nail-plate is firmly gripped or held between said block or jaw and the reciprocating plate. It is desirable that the nail-plate be firmly held between the jaw and the plate B while the punch is operating to sever a blank; and it is also desirable that the punch be made to operate as near the nail-plate-holding devices as possible, in order that the nail-blank may not be twisted or otherwise distorted while being punched. Although we have not in the drawings represented the nail-plate-holding device and punch as near each other as they can be arranged, yet we wish it to be considered that we prefer this last-named construction. The jaw or block B' is given the movements above indicated by means of the same cam-groove $b$ that operates to reciprocate the feeding-plate, and this cam actuates the said jaw or block by means of the connecting rod or bar $b^4$ and the lever $b^5$, (see Figs. 8 and 9,) pivoted at $b^6$ to a bracket, $b^7$, secured to the bed of the machine, upon the end $b^8$ of which lever the jaw or block is arranged to slide. There may be any suitable connection between the end of this lever and the block or jaw, and we have shown the short rod $b^{10}$ held by two upwardly-projecting portions, $b^{11}$, of the block or jaw, which rod passes through a horizontal slot in the end of the lever. Consequently the block or jaw may be reciprocated horizontally with the plate B and moved downward or upward in relation thereto by the lever.

The devices for severing a blank from the nail-plate consist in the die C and the punch C', the latter being held in the punch-holder $c$ in any desirable way. The punch-holder is fastened by the set-screw $c'$ to the block $c^2$. This block is reciprocated by means of the cam-grooves $c^3$ in the cam-disk $c^4$ on the main shaft $A^2$ and the cam-pins $c^5$, which project inwardly from the upwardly-projecting arms $c^6$ and by the edge-cam $C^2$. The block $c^2$ is made adjustable in any direction in the housing in which it reciprocates, in order that the punch may be adjusted to its proper position in relation to the die. This feature is accomplished by making the block triangular in cross-section and by arranging the gibs $c^7$ within the housing, so that they may be horizontally adjustable in relation thereto by means of the screws $c^8$. The front of the housing is a plate, $c^9$, which is fastened by means of screws to the remainder of the housing. A sufficient space within the housing is provided so that the gibs may be moved in adjusting the position of the block $c^2$.

Figure 1:
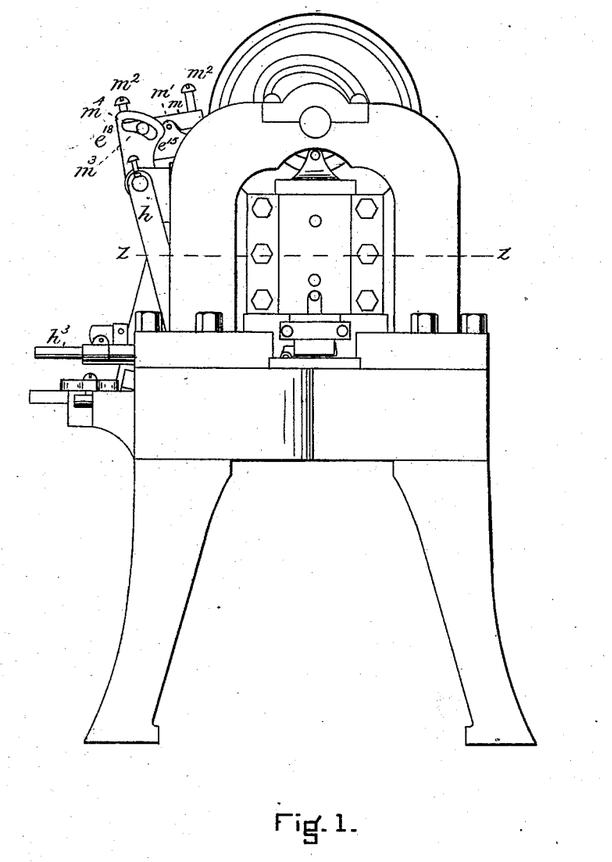
Figure 1 is a front elevation of our machine.
Figure 2:
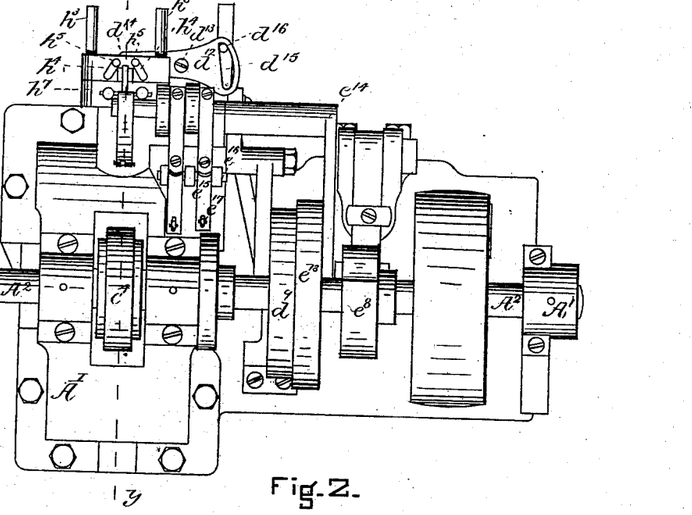
Fig. 2 is a plan thereof.
Figure 3:
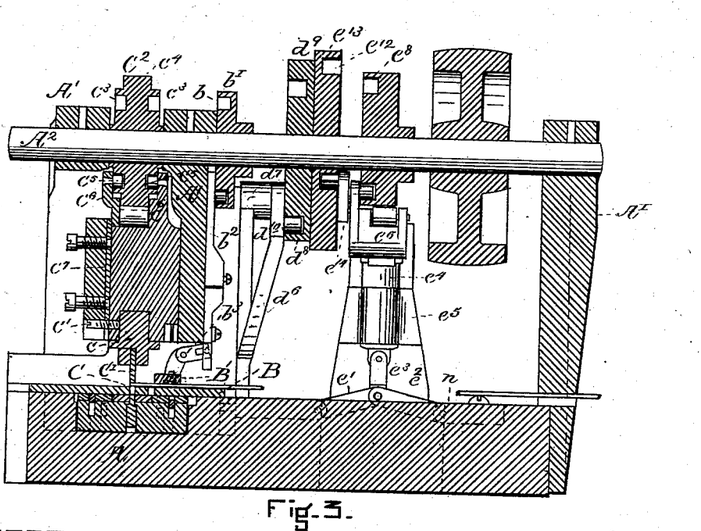
Fig. 3 is a central vertical section lengthwise the machine.
Figures 4, 5, 17:
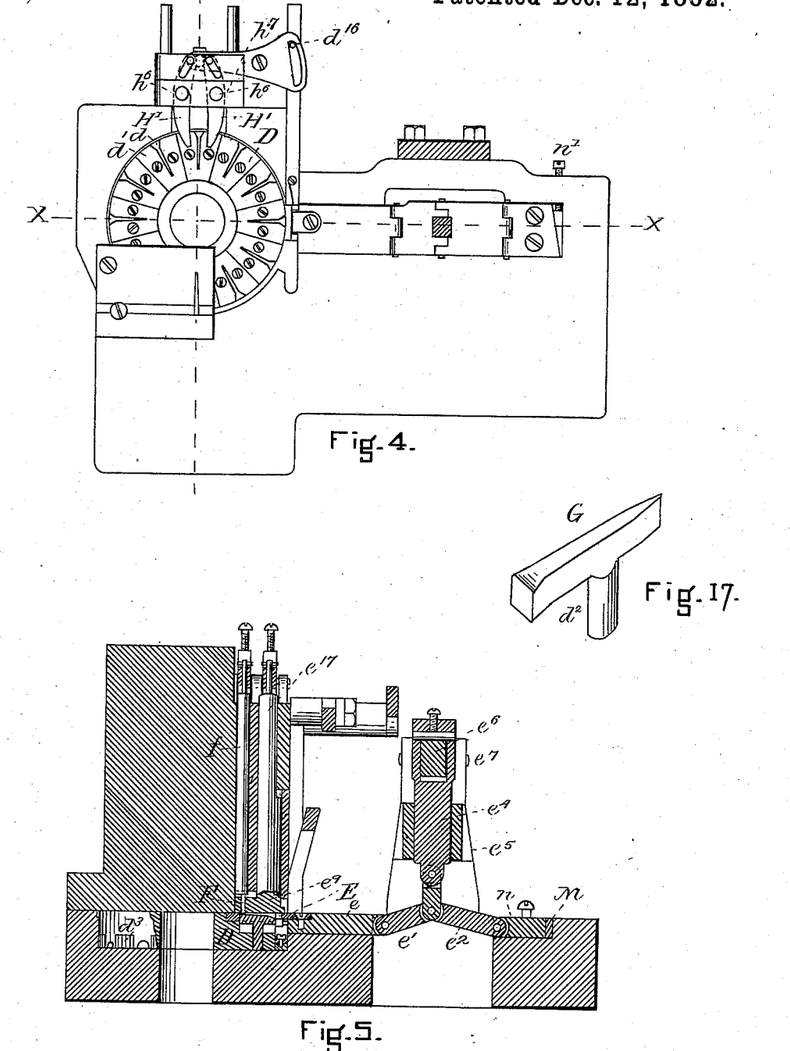
Fig. 4 is a plan of a portion of the blank-carrying, heading, and nail-removing mechanism.
Fig. 5 is a vertical section on the line $xx$ of Fig. 4, representing especially the construction of the heading devices.
Fig. 17 is a detail view of a part of the invention more fully described hereinafter.
Figure 6:
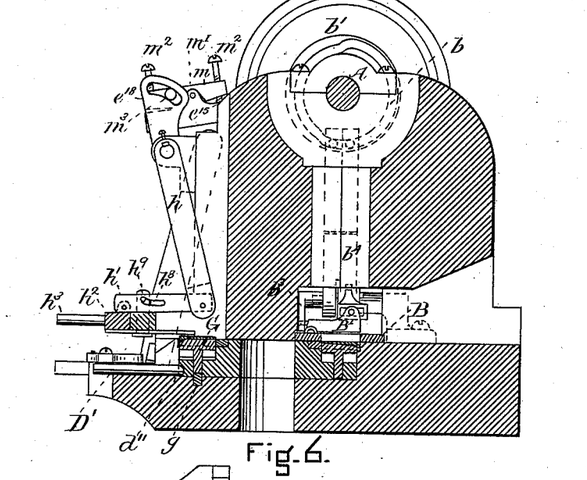
Fig. 6 is a vertical cross-section on the line $yy$ of Fig. 2.
Figure 7:
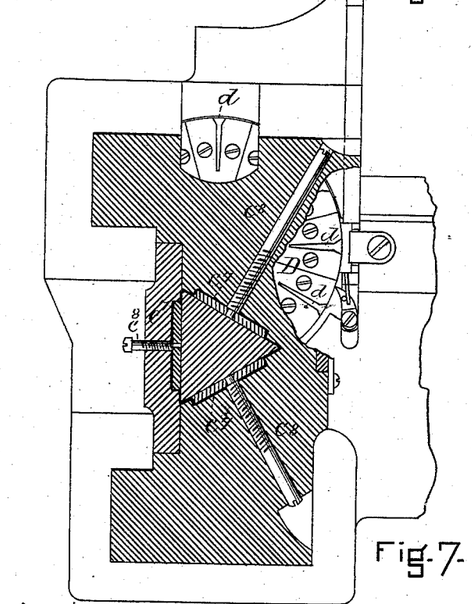
Fig. 7 is a horizontal section on the line $zz$ of Fig. 1, with a portion of the frame broken away to show the nail-carrier.
Figures 10, 11, 12, 13:
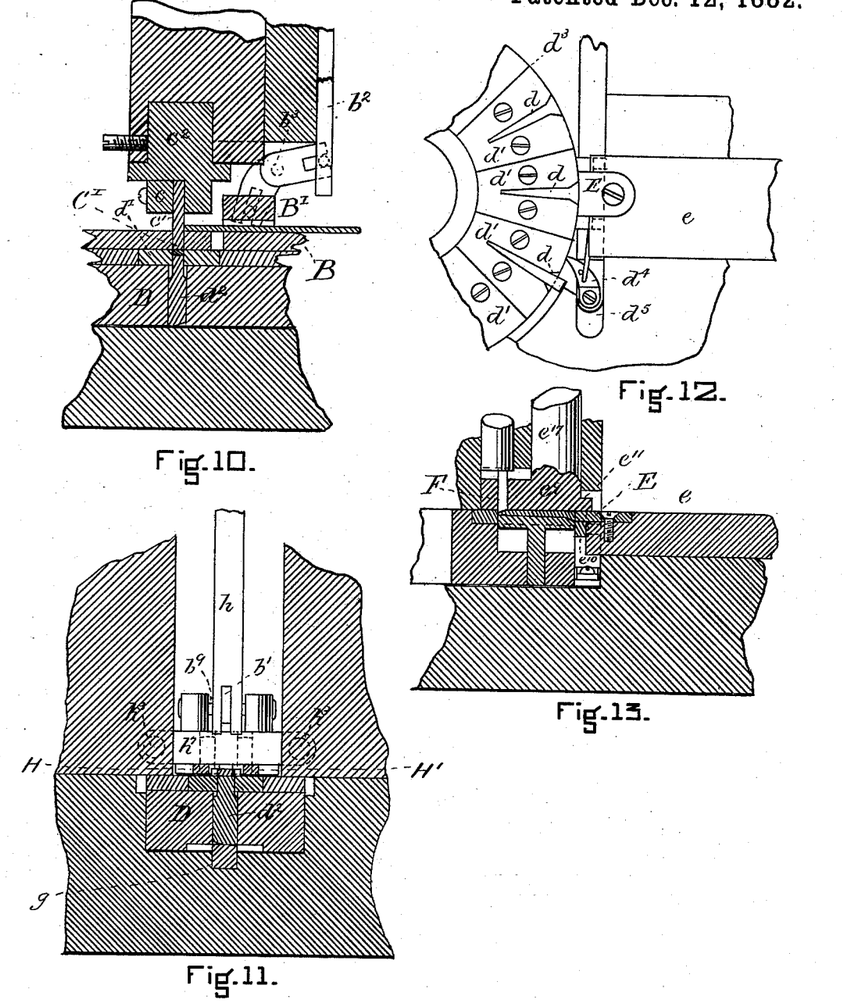
Fig. 10 is a section enlarged, representing a portion of the nail-plate-feeding mechanism and a punch and die.
Fig. 11 is an enlarged section, further representing the construction of the nail-plate-feeding, punching, and nail-blank-carrying devices.
Fig. 12 is an enlarged view representing the method of rotating the blank-carrier.
Fig. 13 represents in vertical section the relation of the blank-carrier and blank-holder to the heading mechanism.
Figure 14:
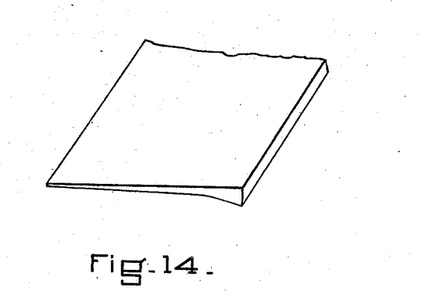
Fig. 14 is a perspective of the nail-plate employed.
Figure 15:
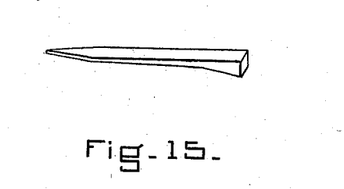
Fig. 15 is a perspective of a blank punched therefrom.
Figure 16:
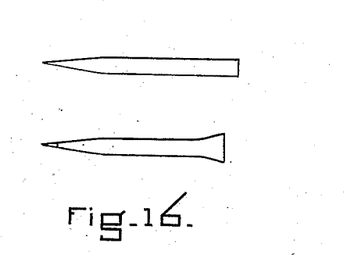
Fig. 16 represents in plan the block before it is headed and after it is headed.

Below the die is arranged the carrier D. (See Fig. 4.) This carrier is a disk provided with any desirable number of recesses or blank-holders $d$ of the shape of the shank of the blank and of the head of the finished nail. These recesses or holders preferably are formed in the plates $d'$, which are fastened by screws, or in any other desirable manner, to the disk, and the bottom of each of these recesses preferably is movable vertically, as will hereinafter be more fully described, to lift the nail from the recess just before it is removed therefrom. The disk is revolved on the post $d^2$ by means of the ratchet-wheel $d^3$ and pawl $d^4$ upon the end of the arm or rod $d^5$. This arm or rod is reciprocated by means of the bell-crank lever $d^6$, pivoted at $d^7$, and the cam-groove $d^8$ in the cam-disk $d^9$ on the main shaft, the cam-pin $d^{10}$ projecting from the end of one arm of the lever entering the cam-groove. The pawl is held in contact with the teeth of the ratchet-wheel by means of a suitable spring, and upon the movement of the bar in one direction the carrier is revolved the distance between two blank-holders, and it rides over the teeth of the pawl on its reverse movement. The disk or carrier is automatically locked while the feeding mechanism is at rest, or returning preparatory to again feeding, by means of the bolt D', which shuts into one of the recesses, $d^{11}$, in the periphery of the disk, and there are as many recesses as there are blank-holders. This bolt D' is also operated by the cam $d^8$, the bell-crank lever $d^6$, and the bar $a^5$, by means of the connecting-lever $d^{12}$, pivoted at $d^{13}$, which takes hold of the end of the bolt at $d^{14}$, and is provided at its other end with a slot, $d^{15}$, in which a pin, $d^{16}$, upon the bar $d^5$ reciprocates, and which, in connection with the ends of the slot, upon the outward movement of said bar, causes the bolt to be driven into its socket or recess in the disk or carrier, and upon the inward movement of said bar causes the bolt to be withdrawn therefrom, and the slot allows the bolt to remain in the socket while the pawl is being moved in position preparatory to feeding, when the bolt is withdrawn, and is not moved back until the pin has again traversed the slot upon the outward movement of the bar, when the bolt is thrown in. The carrier D moves the blank-holders $d$ and the blanks that are forced therein by the punch from the die to the heading mechanism, and this consists in a reciprocating plunger or header, E, carried by the sliding plate $e$, which is reciprocated by means of the toggle $e'$ $e^2$, link $e^3$, and the block $e^4$, which is moved vertically in the housing $e^5$ by means of the lever $e^6$, pivoted at $e^7$, and the cams $e^8$ $e^8$ upon the main shaft. During the heading operation the nail-blank is held in the holder $d$, and the plate $e^9$ (see Fig. 13) is moved down upon the blank-carrier, so that the shank of the nail-blank is firmly held in the carrier. The plate $e^9$ projects beyond the outer end of the blank, and its under surface, in connection with the sides and bottom of the head forming and receiving recess of the blank-holder, forms a die or mold, which gives shape to the head of the nail. Before the head is upset by the plunger it projects from the holder or beyond the edge of the disk, and when in position for heading this projecting portion is between the bed $e^{10}$ and the extension $e^{11}$ of the plate $e^9$, and it is between this bed $e^{10}$ and plate $e^{11}$ that the plunger moves. The bed $e^{10}$ is stationary, and may be a portion of the frame-work of the machine, or may be an interposed block, and it forms a lower wall of the recess, which is practically a continuation of the blank-holder, in which the end of the blank rests, and in which it is upset by the action of the header which drives that portion of the blank into the head receiving and forming portion of the blank-holder. The plunger, upon its inward movement against the end of this projecting portion of the head, displaces and upsets the head-forming portion, so that the metal of the head takes the form of the die above spoken of. The holding-plate $e^9$ above spoken of is given a downward vertical movement to the blank carrier after the blank has come to rest beneath it, and is held thereon during the operation of the header or upsetting device, and is then moved upward to enable the headed blank or nail to be moved therefrom to the delivery devices. These movements are imparted to the plate by means of the cam-groove $e^{12}$ in the cam-disk $e^{13}$ on the main shaft, the crank $e^{14}$, and the lever $e^{15}$, which is pivoted at $e^{16}$, and lays hold of the end of the connecting bar $e^{17}$, to the lower end of which the plate $e^9$ is secured, and which is connected with the crank, or with an arm, $e^{18}$, attached to the crank, in a manner hereinafter described, to provide for variations in the movement of the end of the lever, and consequently of the plate $e^9$. The nail may be pointed at the same time that it is headed, if desired, and we represent in Figs. 5 and 13 mechanism for doing so. It consists in the pointing-punch F, which is arranged to be reciprocated between the inner end of the plate $e^9$ and the frame of the machine to act upon the point end of the blank. This pointing-punch is reciprocated by means of the cam and crank that reciprocate the plate $e^9$ and the rod $f$, and mechanism connecting the end of the rod with the crank, similar to that used in connecting the crank with the rod $e^{17}$. The blank having been headed, or headed and pointed, is then conveyed by the carrier to the delivery devices, and immediately before it reaches a position to be seized by them the bottom or under surface of the blank-holder, which is a plate adapted to be moved vertically, and which is shown in its elevated position in Fig. 6, is caused to be moved upwardly, thereby lifting the blank from the holder. This plate is lettered G, and each blank-holder is provided with one. They revolve with the carrier and disk, and upon reaching a position nearly opposite the delivery devices come in contact with a stationary wedge, $g$, which causes them to be lifted, as before described. The lower end of the plate should be somewhat beveled or undercut inwardly, so that it may come in contact with the inclined lifter or wedge $g$ gradually.

The delivering devices consist in the two fingers H H', which grasp the head of the nail and draw it outwardly from the carrier and then release it. These fingers are given these movements by means of the cam-groove $e^{12}$, crank $e^{14}$, the lever or arm $h$ at the end of the crank, and the link $h'$, which connects the lower end of the lever with the carriage $h^2$. This carriage is arranged to slide on the rods $h^3$, and it has two diverging slots, $h^4$, in which pins $h^5$ on the ends of the fingers H H' project. The fingers H H' are pivoted at $h^6$ to the block $h^7$, which is also moved upon the rods $h^3$ by the same mechanism that operates the block $h^2$, but not in unison therewith, the said block $h^7$ being stationary, while the block $h^2$ is being moved out, thereby causing the diverging slots to move the ends of the fingers toward each other. The two blocks are then moved outwardly together, and upon the reverse movement the block $h^2$ commences to move inwardly, thereby causing the slots to ride on the pins and open the fingers, allowing the nail to drop therefrom, when the two blocks return to their original position. This movement of the inner block, $h^7$, in relation to the outer block is caused by providing the link $h'$ with a slot, $h^8$, and the said block $h^7$ with a pin or rod, $h^9$, which shall pass through the slot and be connected directly with the block, or with the pivots of the fingers which pass upwardly through the block, and this slot provides for the lost motion, or the difference in motion, whereby the inner block moves a less distance than the outer block and effects the movement of the fingers described. In addition to a direct reciprocating movement, the fingers may have a drop movement immediately before closing upon the head of the nail by simply providing the outer end of the slot $h^8$ with an incline, as shown in Fig. 6, and by making the pivots of the fingers vertically movable in the inner block, $h^7$.

The mechanism for providing the plate $e^9$ and the punch F with variable movements being the same, we will describe the construction of one only, and we will take that used in connection with the plate best represented in Fig. 6.

The connecting-lever $e^{15}$, instead of being attached directly to the arm $e^{18}$ on the crank, is connected therewith by means of an arm, $m$, pivoted at $m'$ to the upper part of the lever, and having at each end an adjusting-screw, $m^2$, which passes through the end of the arm and bears upon the top of the lever. It also has a pin, $m^3$, which enters the cam-slot $m^4$ in the arm $e^{18}$. By depressing the inner end of this lever $m$ or raising the outer end the position of the main lever $e^{15}$ is changed, the inner end being lifted and the outer end being depressed, and by reversing the position of the auxiliary lever or arm of course a reversal of the position of the main lever is effected. By moving the adjusting-screws $m^2$ in or out, as the case may be, the extent of the movement of the lever $e^{15}$ may be varied as desired. Of course the pointing-punch F is arranged to be horizontally adjustable in its support to provide for variations in the length of the blank.

The toggle for operating the plunger or header may be adjusted horizontally by means of the wedge M and the block $n$, to which the member $e^2$ of the toggle is hinged, and which is fastened to the frame by screws passing through slots in such a manner as to permit it to be moved by the wedge horizontally. Its end surface against which the wedge operates is made parallel with the surface of the wedge, and the other surface of the wedge bears against the frame of the machine, and the wedge is moved at right angles to the axis of the toggle by means of the screw $n'$. If moved inward, of course the toggle, sliding plate, and header are moved toward the carrier. If moved outward, the toggle and its connections are forced in the opposite direction.

It will be observed that the punch forces the blank through the die into the blank-holder and acts in connection therewith to straighten the blank; also, that the punch is driven down by direct pressure of the edge-cam and lifted by the cam-grooves; also, that the feeding-plate and its jaw are operated by the same cam, but by different connecting devices; also, that the plate $e^9$, the pointing-punch, and the delivering-finger are operated from the same crank. The feeding devices, header, and the blank-carrier may be operated by other mechanism equivalent to that herein described without departing from the spirit of this invention.

It will be observed, also, that the head-forming portion of the blank-holder has its under surface inclined downwardly and outwardly to correspond to the face of the head-forming portion of the blank, and the said head-forming portion of the holder being thus shaped upon its under surface, and also being widened upon either side, the thrust of the heading mechanism is received at this portion of the holder and the head-forming portion of the blank is shortened and widened, but not thickened.

It will further be observed that the plate $e^9$, which shuts over the blank-holder, does not receive the thrust of the header, but simply holds the blank in position in the holder.

In operation the nail-plate is fed between the feeding-plate and its jaw and the machine set in motion. The jaw then closes on the plate and the feeding device then positively moves forward the nail-plate to the punch and holds the plate stationary while the punch is severing a blank therefrom. It then returns to its original position, the jaw lifting from the nail-plate, while the nail-plate is held stationary by any suitable frictional mechanism, when it again advances as before. The blank severed from the plate is forced into the carrier and straightened, and by it is conveyed to the heading mechanism and headed, and from thence to the delivery devices, where it is removed from the carrier and dropped from the machine.

We show a nail pointed upon its back side, $o$, instead of upon its front side, in the ordinary manner, and we consider that this is an improvement thereon.

The chief advantage that arises from the process is the great saving in waste that is made.

Of course the various stages of the process may be performed by separate machines, or by differently-organized machines, without departing from the spirit of our invention.

Having thus fully described our invention, we claim and desire to secure by Letters Patent of the United States—

1. In a horseshoe-nail machine, a nail-plate-feeding mechanism consisting of the plate B, the jaw B', and cam $b$ and connecting mechanism, substantially as specified, for positively reciprocating said plate B, and for automatically moving said jaw B' to and from said plate B, all substantially as and for the purposes described.

2. The combination, in a horseshoe-nail machine, of the nail-plate-feeding mechanism and blank-severing devices, comprising a punch and die, the series of blank-holders $d$ upon the blank-carrier, into which holders the blanks are pressed and straightened by the punch, and which carrier is adapted to transfer the blanks automatically to the heading mechanism, a reciprocating header, and a covering-plate, $e^9$, for holding the blank in the blank-holder during the heading operation, all substantially as described.

3. The combination of a blank-carrier having a series of blank-holders, $d$, of the full length of the shank of the blank, adapted to present blanks in successive order to the heading mechanism, with the plate $e^9$, adapted to be moved vertically upon the blank-holder plate $d'$, over the blank-holder, and the reciprocating header E, all substantially as described.

4. The combination of a revolving blank-carrier, supporting a series of blank-holders, $d$, a plate, $e^9$, adapted to be shut upon the blank-holder, the reciprocating header E, the carrier and the specified devices for revolving it, whereby the blank is transferred from the heading mechanism to the nail-removing mechanism, the specified mechanism for removing the blank from the blank-holder during said movement of the carrier, and the means described for grasping the blank and drawing it from the holder, all substantially as set forth.

5. The combination of a blank-carrier having a series of blank-holders, $d$, and means for revolving it, a plate, $e^9$, of a width sufficient to rest upon the carrier on each side of the blank-holder, but not to project into the holder, and means, substantially as specified, for moving the same vertically in relation to the carrier during the revolution thereof, all substantially as and for the purposes set forth.

6. The combination of the reciprocating plate B, and its vertical movable jaw B', with the reciprocating punch C and the die C', all substantially as described.

7. As a means for operating the header E, the toggle $e'$ $e^2$, link $e^3$, block $e^4$, lever $e^6$, and cams $e^8$, all substantially as and for the purposes described.

8. The combination of the blank-carrier D, having a ratchet, $d^3$, and bolt-holes $d^{11}$, with a spring-pawl, $d^4$, the bolt D', and intermediate connecting mechanism, substantially as specified, and the cam $d^8$, all substantially as described.

9. The combination of a blank-holder, $d$, the vertical movable plate $e^9$, adapted to close over the blank-holder, but not extending to the extreme point end thereof, a bed, $e^{10}$, and reciprocating header E, all substantially as and for the purposes described.

10. The combination of the blank-holder $d$, its covering-plate $e^9$, and mechanism for providing the said plate with a vertical movement, consisting of the cam $e^{12}$, the rod $e^{17}$, and intermediate connecting devices, substantially as specified, for varying the position of the plate and the extent of its movement in relation to the blank-holder, all substantially as and for the purposes set forth.

11. In an organized horseshoe-nail machine, the combination of nail-plate-feeding mechanism adapted to feed the nail-plate to the punch and die, said punch and die, a blank-carrier supporting a series of blank-holders and adapted to bring them successively beneath the die and move them to the heading mechanism, the said heading mechanism, and the specified mechanism for providing the various devices with the movements in relation to each other, all as set forth.

12. The combination of a blank-holder, the covering-plate $e^9$, and the reciprocating point-forming swage F, all substantially as and for the purposes described.

13. The combination of the punch C, the die C', and a series of blank-holders, $d$, adapted to be brought successively beneath the die, all arranged in relation to each other and operated as specified, whereby the blank is punched from the nail-plate and deposited in the blank-holder, and straightened therein by the punch, all as set forth.

14. As a means of adjusting the horizontal position of the punch, the block $c^2$, triangular in cross-section, the movable gibs $c^7$, and the adjusting-screws $c^8$, all as described.

15. In an organized machine for making horseshoe-nails, the combination of devices for feeding the nail-plate automatically to a reciprocating punch and its die, with said reciprocating punch and its die, a series of blank-holders adapted to be brought each successively beneath the die to receive a blank and to hold it while being straightened by the severing-punch, in which holders the blanks are carried in succession to a heading mechanism, and to nail-removing devices, and said heading mechanism and said nail-removing devices, and operative mechanism whereby the various parts are moved in successive order, all substantially as and for the purposes described.

16. The combination of the blank-holder $d$, its covering-plate $e^9$, and bed $e^{10}$, with the header E, the reciprocating block $e$, the toggle $e'$ $e^2$, link $e^3$, reciprocating block $e^4$, and movable block $n$, and the wedge $n'$, all substantially as and for the purposes described.

In witness whereof we have hereunto set our hands this 16th day of July, 1881, at Boston, Massachusetts.

H. E. GRANDY.
E. F. GRANDY.

Witnesses:
F. F. RAYMOND, 2d,
W. C. FOGG.